Aug. 23, 1955 E. W. SMITH ET AL 2,716,155
TELEPRINTING APPARATUS
Filed June 20, 1952 6 Sheets-Sheet 1

Ernest W. Smith
Harold J. Hillyard
Inventors

By
Cushman, Darby & Cushman
Attorneys

Aug. 23, 1955
E. W. SMITH ET AL
2,716,155
TELEPRINTING APPARATUS
Filed June 20, 1952
6 Sheets-Sheet 2
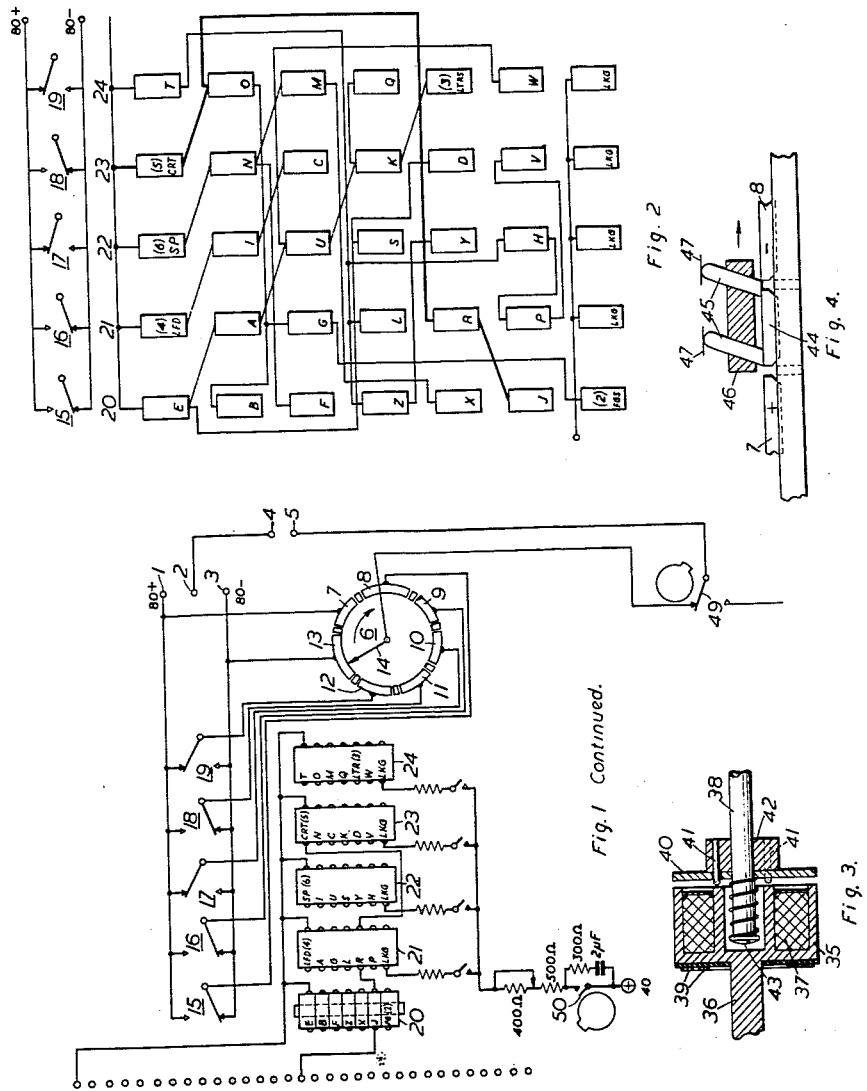
Ernest W. Smith
Harold J. Hillyard
Inventors
By
Cushman, Darby & Cushman
Attorneys

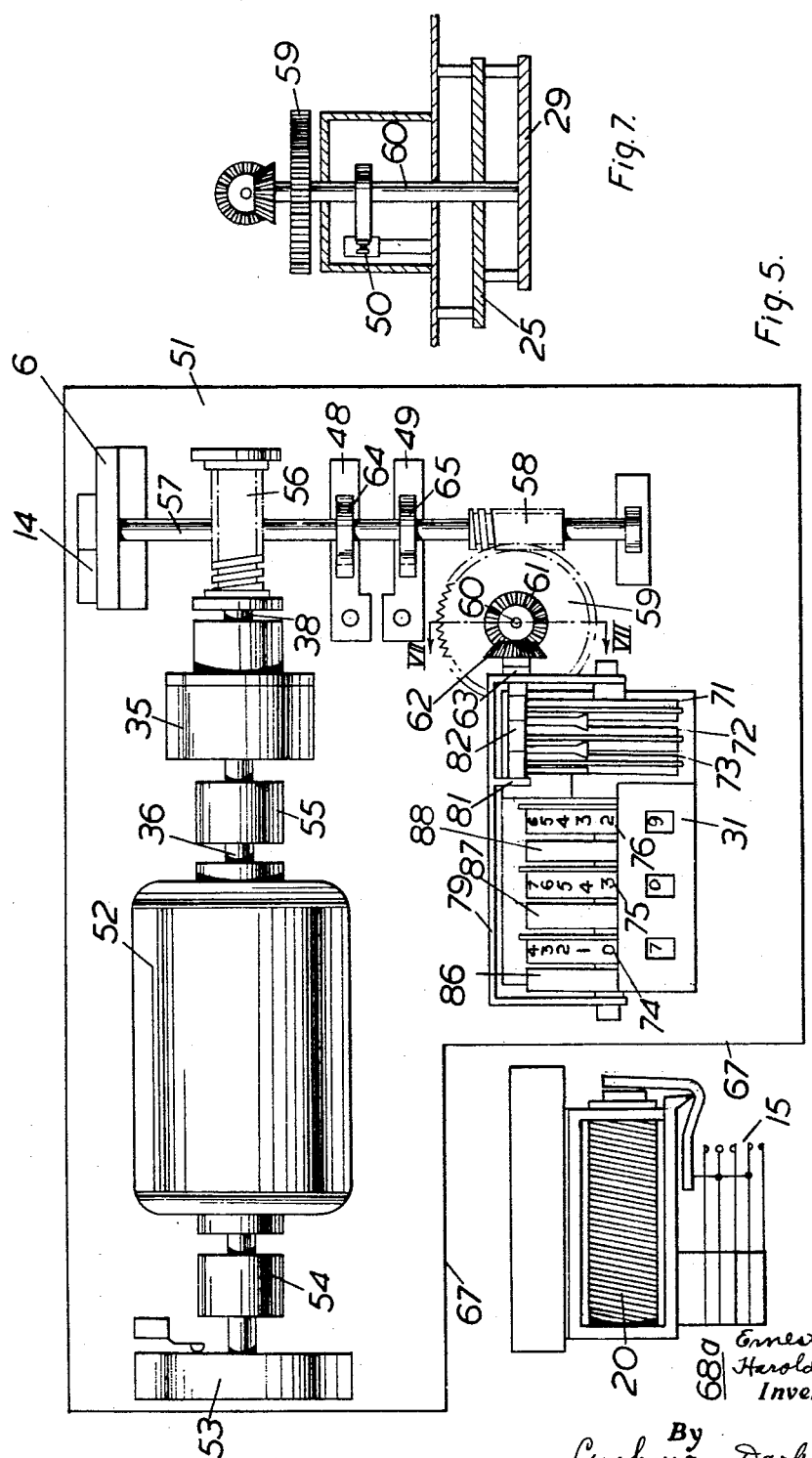

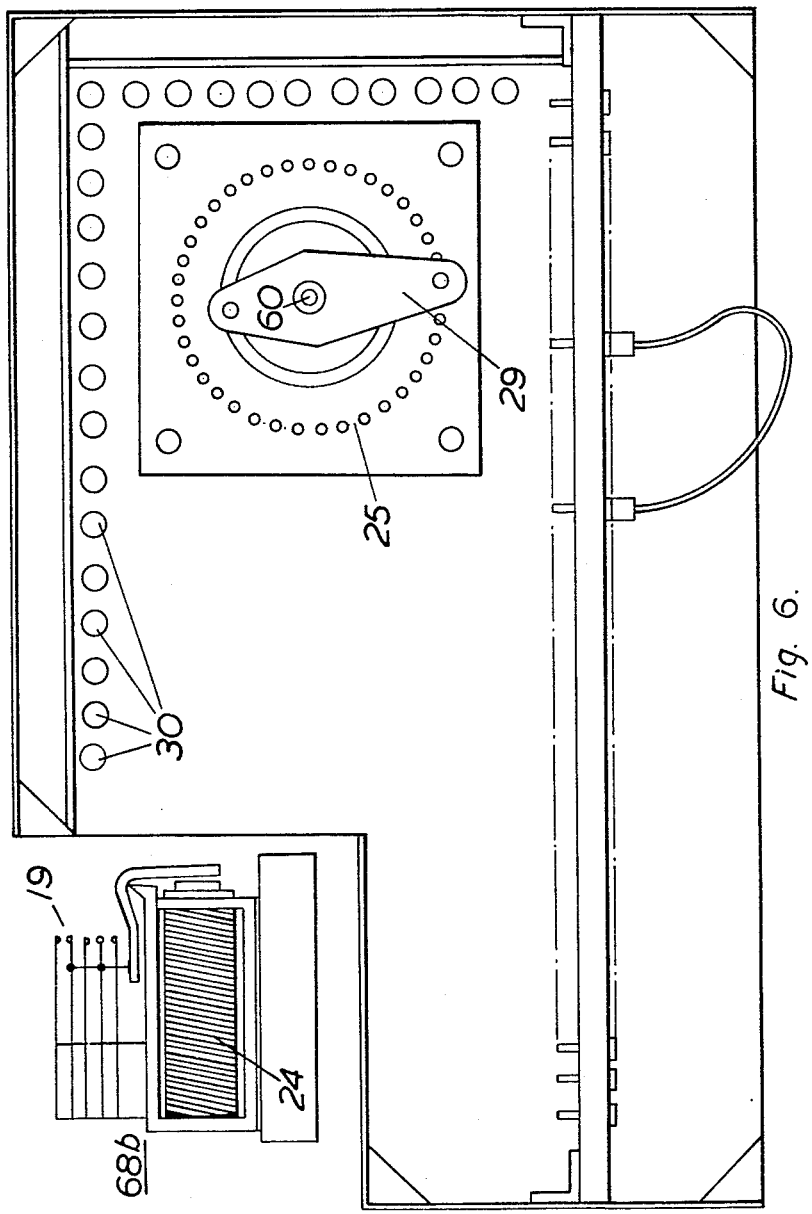

Aug. 23, 1955  E. W. SMITH ET AL  2,716,155
TELEPRINTING APPARATUS
Filed June 20, 1952  6 Sheets-Sheet 5
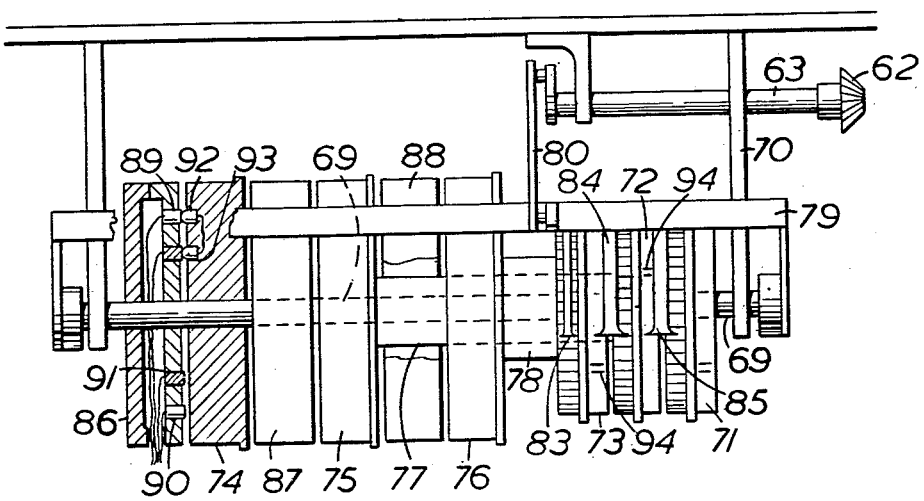
F I G. 8
Ernest W. Smith
Harold J. Hillyard
Inventors
By
Cushman, Darby & Cushman
Attorneys Aug. 23, 1955  E. W. SMITH ET AL  2,716,155
TELEPRINTING APPARATUS Filed June 20, 1952  6 Sheets-Sheet 6

Ernest W. Smith
Harold J. Hillyard
Inventors

By
Cushman, Darby & Cushman
Attorneys

United States Patent Office 2,716,155
Patented Aug. 23, 1955

2,716,155

TELEPRINTING APPARATUS

Ernest William Smith, Welling, and Harold Thomas Hillyard, Chislehurst, England, assignors to National Research Development Corporation, London, England Application June 20, 1952, Serial No. 294,582

Claims priority, application Great Britain June 26, 1951

3 Claims. (Cl. 178—17)

This invention relates to teleprinter transmitting apparatus, that is to say, apparatus for transmitting messages by means of D. C. charges, pulses of oscillatory energy, or like energy forms transmitted in succession to provide a series of signals, each of which is in one of two possible conditions, termed in practice Mark and Space. In the case of double current working, a signal may be in the form of a negative charge (Mark) or a positive charge (Space). A message is derived from a multi-unit code of signals (a seven-unit code being normal), each character of the message being represented by the sequential order in which the signals are transmitted. The signals may be transmitted over any line used in communication systems, for example, a D. C. telegraph circuit, a channel of a voice-frequency telegraph system or a channel of a wireless link, and the term "line" as used herein is to be interpreted in this sense.

In the known teleprinting apparatus, transmission is effected manually with the use of apparatus like a typewriter or automatically with the use of a record, in the form of a perforated tape, which has been manually prepared. As distinct from the known apparatus, the present invention provides a means of transmitting limited forms of message automatically without the use of a tape. In its simplest form a machine according to the invention can be used for the repeated transmission of message characters in a predetermined sequence, for example, for use in testing and servicing equipment where it is often desirable that flawless transmission should proceed continuously over a considerable period but inconvenient to prepare a tape of sufficient length. Alternatively a machine according to the invention may be used to transmit single messages of standard form which form may supplement a large number of different messages. This mode of use is of particular value under the following circumstances.

For facilitating the handling of teleprinter traffic it is desirable that each message transmitted should include a preamble containing information such as the designation of the channel over which a message is communicated and the number of the message in a series communicated over a particular channel. In the case of high speed working where the tape transmission is employed, such information is not generally available until the tape reaches the transmission room and consequently does not appear in the message as recorded on the tape. One method of dealing with this drawback has been to prepare in an ordinary perforator a series of relatively short tapes, known as preamble tapes, each bearing the additional information required and each including a different serial number, and to transmit the preamble required with the use of such tapes.

The use of preamble tapes has many disadvantages. Firstly it slows down the handling of traffic since for each message handled two tapes must be inserted in a transmitter, one for the preamble and one for the text. Secondly it involves the use of some filing system or some special procedure to ensure that a preamble tape selected bears a serial number appropriate to a particular message, and mistakes are liable to occur in practice. Thirdly a fresh set of preamble tapes must be frequently prepared as the tapes soon wear out or become damaged with repeated use.

The primary object of the present invention is to provide, for use in conjunction with a tape operated transmitter, an auxiliary machine which will transmit a preamble without a tape. In one form of the invention means are provided for changing progressively the serial number which forms part of the preamble automatically every time the machine is operated.

The invention has an additional advantage in that, in conjunction with a suitable switching circuit, it permits a pair of tape-operated machines to be used alternatively, a tape being inserted in one machine while the other is transmitting, and thus further speeds up the handling of traffic.

With the foregoing objects in view according to the invention there is provided transmitting apparatus of the kind referred to above comprising a series of change-over devices, each device establishing either of two alternative signal conditions, a distributor for applying successively to the line a signal in accordance with the condition established by each change-over device, whereby signals are transmitted in sequences established by the series of change-over devices, various signal sequences representing various message characters, means for establishing a predetermined character sequence representing a message, and means for changing the signal sequences established by the series of change-over devices in accordance with the predetermined character sequence established.

Preferably the apparatus includes an automatic device which changes the predetermined character sequence, at least in part, each time the apparatus is operated to transmit a message, for the purpose hereinbefore specified.

In a suitable arrangement for carrying the invention into effect the series of change-over devices each establishing alternative signal conditions comprises a series of relays, each relay comprising a change-over switch operated by one of several windings mounted on the same core. The individual windings are interconnected in such a way as to provide a multiplicity of actuating circuits, each of which is adapted when energised to establish a different combination of switch positions, each combination representing a particular character. Since the operation of standard teleprinter apparatus is based on the use of a 7-unit code (of which two units serve exclusively for establishing the start and stop signals), the apparatus according to the invention employs in practice 5 change-over devices. The core of each relay is provided with 7 windings and consequently a multiplicity of different switch combinations are possible.

A suitable device by which a predetermined character sequence may be established comprises a plug board having two series of sockets. One series of sockets represents the message characters, namely, the letter characters A—Z (certain of which, in accordance with standard teleprinter practice, also represents numeral characters) and various symbols including "shift," "space," etc., each socket being suitably marked. The other series of sockets are consecutively numbered sockets representing the sequence in which the characters are to appear in the message. The message is set up by jumping the number sockets across to the required character sockets.

In this arrangement selected circuits actuating the change-over devices are completed by jumping across the sockets on the plug board and each circuit so completed is energised in turn through the medium of a distributor (hereinafter referred to as the Character Selector Distributor), the fixed contacts of which are connected with the numbered sockets on the plug board.

The automatic device hereinbefore referred to for changing the predetermined character sequence may comprise an additional distributor (or a series thereof arranged as in a counter) operating in combination with the said Character Selector Distributor. For use with this device the plug board contains an additional socket connected to the moving contact of the additional distributor, the fixed contacts of the said distributor being connected to different circuits actuating the change-over devices whilst the moving member of the said distributor may be arranged to be advanced one step each time the Character Selector Distributor completes its cycle of operation. Any selected number socket on the plug board may be jumped across to the additional socket so that several different actuating circuits are energised in turn through the medium of the additional distributor. It will be appreciated that by providing three additional distributors operated in step in the manner of a counter and representing units, tens and hundreds, together with suitable additional sockets in the plug board a series of messages can be transmitted including serial numbers which change progressively each time the machine is operated up to a total of 999 messages.

As a practical example of the invention there will now be described with reference to the accompanying drawings a machine, for use in conjunction with one or more tape-operated transmitters, for transmitting a series of message preambles bearing progressive serial numbers.

In the drawing:

Figure 2 is a circuit diagram showing the way in which the individual windings of the change-over relays are interconnected;

Figures 3 and 4 illustrate details of the machine.

Figure 5 is a plan of the machine;

Figure 6 is an underside view;

Figure 7 is a section on the line VII—VII, Figure 5;

Figure 8 illustrates the counter, and;

Figure 1:
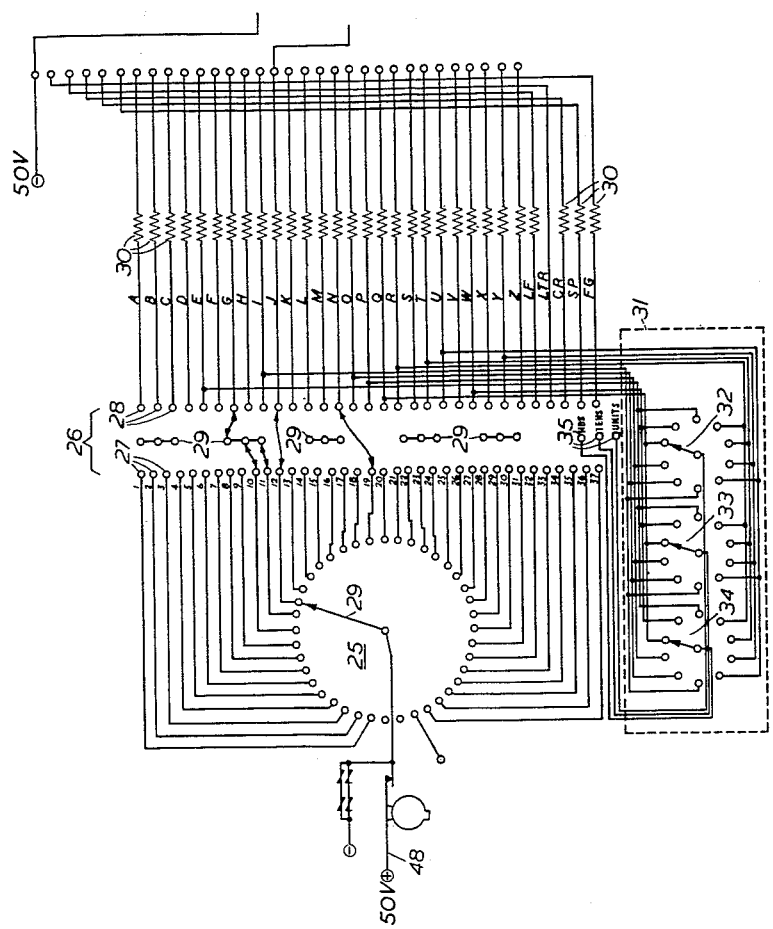
Figure 1 is a circuit diagram of a complete machine arranged for operation in accordance with the invention.
Figure 9:
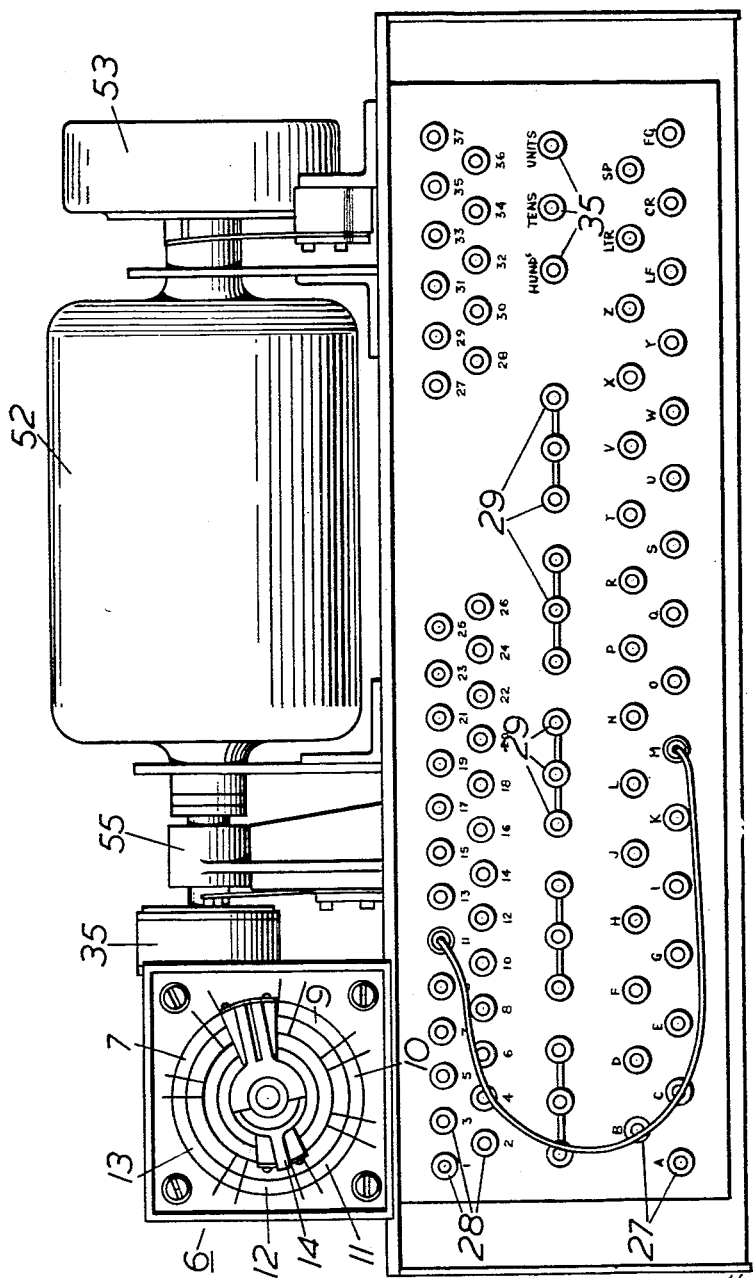
Figure 9 is a side view showing the plug board.

Referring to Figure 1, the terminals 1, 2 and 3 are respectively the input from the normal 80–0–80 volt supply for the telegraph signalling circuit and 4 and 5 are the telegraph line output terminals. A distributor 6 (hereinafter referred to as the Character Element Distributor), having seven fixed contacts indicated by 7—13 and a wiper 14 sets up line conditions which are predetermined by a change-over device including five switches 15—19. For this purpose the wiper 14 is connected to one side of the telegraph line whilst the fixed contacts, 8, 9, 10, 11 and 12 are connected to the moving members of the five change-over switches 15—19. The two fixed contacts of each of the change-over switches are connected to the +80 and —80 volts supply lines respectively. The fixed contacts 7 and 13 of the distributor 6, that is, the first and last contacts, are connected respectively to the +80 volt and —80 volt supply. Thus the wiper 14 rotates, a series of signals in the form of either positive or negative D. C. charges are applied to the line through the terminals 4 and 5, the series of charges always commencing with a positive charge and ending with a negative charge whilst the sequence of the signals forming the other five charges depends on the combination of switch positions set up by the five change-over switches 15—19. In accordance with standard teleprinter practice the first (positive) D. C. charge and the last (negative) D. C. charge constitute respectively the "start" and "stop" signals.

The change-over relay switches 15—19 have energising windings 20—24 each of which comprises seven separate coils mounted on a single core. This is more clearly shown in the case of the winding 20 (Fig. 1). Each separate coil is indicated in the drawing by a different letter character or symbol. The separate coils of the windings 20—24 are interconnected in the manner shown in Figure 2 where each vertical column 20—24 contains the coils forming one relay winding. It will be seen for example that the coils J, R, and CRT are connected together in series, the circuit thence going to a 50 volt supply (minus), so that if this particular circuit is energised, the change-over switches 15, 16 and 18 will be operated, contacts being made by these switches with the —80 volt supply. The switches 15—19 are biased to the +80 volt signalling circuit and since no coil in column 22 or column 24 is energised by the energising circuit specified, switches 17 and 19 will not be operated. Thus the combination of switch position in this particular instance will be as shown in the drawings.

The interconnection of the separate relay coils in the manner shown in Fig. 2 establishes a multiplicity of separate relay actuating circuits, providing 32 different combinations of change-over switch positions. In this way upon the energisation of the appropriate relay actuating circuit all required characters may be communicated on the basis of the standard teleprinter code.

The successive energisation of selected relay actuating circuits is effected by the Character Selector Distributor 25 (hereinbefore referred to) through the medium of a plug board 26. The said plug board has a row of consecutively numbered sockets 27 and a row of appropriately marked sockets 28 representing the entire series of message characters. The wiper 29 of the distributor 25 is connected to the positive side of the 50 volt supply and the fixed contacts of the said distributor 25 are connected as shown to the numbered sockets 27 of the plug board. The sockets 28 form the termination of the thirty-two relay actuating circuits previously referred to. A character sequence is established by jumping across numbered sockets 27 to those sockets 28 which represent the characters required for a message. The plug board 26 also has additional sockets 29 arranged in groups of three linked together and positioned as shown to provide for the case where certain characters are to be repeated.

Resistances 30 of suitable values are interposed between the sockets 28 and the respective relay winding combinations to ensure that the current actuating the relays is constant irrespective of the different number of coils which it traverses in establishing different change-over switch combinations.

The Character Selector Distributor 25 establishes a different change-over switch combination for each step in its rotation whilst the Character Element Distributor 6 feeds to the line seven separate signals (including "start" and "stop") for each change-over switch combination. Thus the latter distributor performs one revolution for each step traversed by the distributor 25.

Associated with the Character Selector Distributor 25 is a device 31 comprising three distributors 32, 33 and 34. These three distributors are mechanically connected with the drive of the said distributor 25 and operate in the manner of a counter. The wipers of the distributors 32, 33 and 34 are connected with extra sockets 35 of the plug board 26 marked Units, Tens and Hundreds respectively whilst the fixed contacts of these distributors are connected in progressive order with those character sockets 28 on the plug board which represent the digits 0–9.

With this arrangement, after the unchanging part of a preamble has been set up, the next numbered socket is jumped across to FG (figure shift) and then in order to establish a progressively changing three-figure serial number, the next three numbered sockets are jumped across to the Units, Tens and Hundreds sockets of the counter 31. For the transmission of the first message of the series the three distributors 32, 33 and 34 are set to 000, the Units distributor moving one step during the transmission of the first characters of the preamble. The counter may have a dial which gives a visual indication of the serial number.

Upon the operation of a suitable switch a relay is energised operating contacts which start the motor and energise a magnetic clutch coupling the machine to the motor. When the machine starts up, cam operated contacts on the machine take over the functions of those on the relay which is then allowed to drop out.

At the end of the message, the motor is switched off and, simultaneously, the clutch disengages the machine from the motor. In order to make the clutch quick acting in disengaging, certain of the contacts not only remove the energising current from the clutch, but pass a small current through it in the reverse direction with the object of removing, or reducing, the residual magnetism.

The clutch, therefore, ensures that the motor, in coming to rest, does not drive the machine long enough for the cam operated contacts to re-make and so set it off on the next message.

The magnetic clutch is shown in section in Fig. 3. The clutch comprises a driving member 35 preferably of soft iron, rigidly connected to the motor shaft 36 and recessed as shown to provide an annular recess housing a winding 37 and a central recess into which extends the end of the main drive shaft 38 of the machine. The winding 37 is energised through slip rings 39 mounted in suitable insulation on the rear surface of the member 35. The said driving member thus constitutes an electro-magnet. The driven member of the clutch comprises a plate 40, preferably of soft iron, forming the armature of the electro-magnet. The plate 40 is axially slidable on dowel pins 41 mounted in a collar 42 secured on the shaft 38 and is held out of engagement with the member 35, when the electro-magnet is not energised by a helical spring encircling the end of the shaft 38, the said spring being held in position by a screw 43 having an enlarged head and screwing into the end of the shaft 38. The operative face of the plate 40 is copper plated. With this arrangement a drive is transmitted by the friction between the plate 38 and member 35 when the electro-magnet is energised.

Fig. 4 is an enlarged view of a detail of the Character Element Distributor 6 looking at the wiper 14 (Fig. 1) end on and with the said wiper in a position midway between two of the series of contacts 7—13. In this position the wiper 14 makes contact with one of a series of small dead contacts 44, there being one contact 44 arranged between adjacent contacts 7—13. The wiper arm 14 carries a pair of carbon brushes 45 mounted in a brush holder 46 and pressed against the contacts of the distributor by means of a common spring 47, the said brushes consequently being connected together electrically. The arrangement illustrated is designed to ensure that the change-over time from one element to another is within specified limits, the brushes 45 being so spaced that the only time lost in passing from (say) a positive to a negative segment is that required for the edge of a brush to pass over the gap between the segments. It has been found that a wide brush has a tendency to become high in the centre after running for some time with the result that the time of making contact with a segment is indefinite and operation unreliable; the arrangement illustrated is, in effect, a wide brush with the centre removed.

The switch 48 makes the 50 volt supply as the wiper arm 29 of the Character Selector Distributor connects with each of the character contacts. The switch 49 changes over the 80–0–80 volt supply from the telegraph signalling circuit from the preamble sending machine to the auto-transmitter (not shown) after the sending of a preamble has been completed. The switch 50 which operates at the same speed as the switch 48 closes a 50 volt line energising locking windings on the relays 21—24 and ensures that the appropriate relays remain closed until the five character element sectors of the distributor 6 have been swept.

Referring to Figs. 5 and 6, the operating parts of the preamble sending machine are mounted on a chassis 51 recessed on its under side. The distributors and counter are driven by a standard teleprinter motor 52 whose speed is controlled by a standard teleprinter-governor 53. The motor shaft 36 extends through bearings 54 and 55 and is connected to the driving member 35 of the magnetic clutch. The output shaft 38 of the clutch carries a worm 56 meshing with a worm wheel on a transverse shaft 57 which carries at one end the wiper arm 14 of the Character Element Distributor 6. The other end of the shaft 57 carries a worm 58 meshing with a worm wheel 59 carried on a vertical shaft 60 extending through the chassis 51 and carrying at its lower end the wiper arm 29 of the Character Selector Distributor 25 (Fig. 6). The upper end of the shaft 60 carries a bevel wheel 61 meshing with a bevel wheel 62 on the input shaft 63 of the counter 31. The said counter is described hereinafter.

The switches 48 and 50 hereinbefore referred to are operated by cams 64 and 65 on the shaft 57 and the switch 49 is operated by a cam 66 on the vertical shaft 60 (Fig. 7). The speeds of the various shafts are: shaft 36 (motor), 3,000 R. P. M.; shaft 57, 400 R. P. M.; shaft 60, 10 R. P. M.

One corner of the chassis 51 is cut away as shown at 67 to accommodate the change-over device comprising the switches 15—19 and windings 20—24. This device comprises five standard post office type 3,000 relays the windings of which have been modified as previously described. These relays are arranged in a tier, the uppermost 68a with winding 20 being shown in Fig. 5 and the lowermost 68b with winding 24 in Fig. 6.

The counter 31 which includes the three number changing distributors 32, 33 and 34 will now be described. On a shaft 69 carried by brackets 70 are mounted three driver drums 71, 72 and 73 and three indicator drums 74, 75 and 76, the latter being suitably marked with the digits 0–9 and corresponding to Units, Tens and Hundreds. The drums 71 and 74 are fast upon the shaft 69 so that rotation of the drum 71 causes the drum 74 to turn with it. The drums 72 and 75 are fast on a hollow spindle 77 surrounding the shaft 69 and the drums 73 and 76 are fast on a second hollow spindle 78 surrounding the spindle 77.

Mounted on the shaft 69 so as to be capable of oscillating thereon is a cradle 79, the said cradle being connected by a link 80 to a crank on the end of the counter input shaft 63. Carried between a bracket 81 (Fig. 5) and one end limb of the cradle 79 is a rod 82 carrying three pawls 83, 84 and 85, the said pawls being free to rock on the rod 82.

Each of the driver drums 71, 72 and 73 has ratchet teeth of such width as to extend half way across the peripheral surface of the said drum, the remaining half of the peripheral surface being plane except for a single notch 94. The pawl 83 engages the ratchet teeth on the drum 73 and when the cradle 79 is rocked by the counter input shaft turns the drum 73 together with the drum 76 through a distance corresponding to one unit. The other two pawls 84 and 85 each have a widened tip which overlaps the smooth surfaces of one drum and the ratchet surface of its adjacent drum. When the cradle 79 is rocked the said two pawls normally slide on the smooth surfaces of the drums 73 and 72 respectively and are held clear of the ratchet teeth on the other two adjacent drums. When however the pawls 84 and 85 fall into the notches 94 motion is transmitted from one drum to the adjacent drum, the appropriate indicator drum 75 or 74 being turned at the same time.

On the left hand side (Fig. 8) of each indicator drum 74, 75 and 76 is a contact holding block 86, 87 and 88, the tops of the said blocks being shaped to correspond with the periphery of the indicator drums. The blocks 86, 87 and 88 carry within them a ring of contacts, two of which are shown at 89 and 90 in Fig. 8, the individual contacts being connected to particular character sockets on the plug board 26 representing digits 0–9, as shown in Fig. 1. The faces of the contacts in the blocks 86, 87 and 88 lie adjacent the sides of the indicator drums 73, 74 and 75. Each of the blocks 86, 87 and 88 also carries a contact ring 91, the said ring being connected to the Units, Tens and Hundreds sockets of the plug board. Within each of the indicator drums 71, 72 and 73 is a pair of inter-connected wiper contacts 92 and 93 which complete the connection between the ring 91 and the appropriate number contact as the said indicator drums are rotated. With this arrangement the serial number of each preamble transmitted is changed successively in the manner previously described.

We claim:

1. Teleprinting transmitting apparatus of the kind in which a message is expressed in a multi-unit code of signals applied to a communication line, each character of the message being represented by the sequential order in which the signals are transmitted, comprising a series of change-over devices, one for each unit of the multi-unit code, each device establishing either of two alternative signal conditions, a distributor for applying successively to the line a signal in accordance with the condition established by each change-over device, whereby signals are transmitted in sequences established by the series of change-over devices, manual means for establishing at will any one of a number of character sequences representing various messages, and repeatedly operating rotary means for changing during each revolution thereof the signal sequences established by the series of change-over devices in accordance with the character sequence established, whereby the same signal sequences are repeatedly applied to the line.

2. Teleprinting transmitting apparatus of the kind in which a message is expressed in a multi-unit code of signals applied to a communication line, each character of the message being represented by the sequential order in which the signals are transmitted, comprising a series of relays, one for each unit of the multi-unit code, each relay controlling a changeover switch operated by one of several windings mounted on the same core, the individual windings being interconnected in such a way as to provide a multiplicity of actuating circuits each of which is adapted when energised to establish a different combination of switch positions, each combination representing a particular character, a plug board having two series of sockets, one series representing characters and the other series representing the sequence in which the characters are to appear in the message, the last mentioned series of sockets forming terminations of the said actuating circuits, means for connecting selected character sockets to sequence sockets in numerical order to establish a predetermined character sequence representing a message, and repeatedly operating rotary means for energising the said actuating circuits in the sequence established, whereby the same signal sequences are repeatedly applied to the line.

3. A preamble sender for use with teleprinting apparatus of the kind in which a message is expressed in a multi-unit code of signals applied to a communication line, each character of the message being represented by the sequential order in which the signals are transmitted, comprising a series of changeover devices, one for each unit of the multi-unit code, each device establishing either of two alternative signal conditions, high speed rotary means for applying successively to the line a signal in accordance with the condition established by each change-over device, whereby signals are transmitted in sequences established by the series of change-over devices, manual means for establishing at will any one of a number of character sequences representing various preambles, repeatedly operating intermediate speed rotary means for changing during each revolution thereof the signal sequences established by the series of change-over devices in accordance with the character sequence established, and low speed rotary means for changing in part the character sequence established, whereby certain signal sequences are repeatedly applied to the line together with other signal sequences which change successively.

References Cited in the file of this patent

UNITED STATES PATENTS

| | | |
|---|---|---|
| 1,010,413 | Chehore | Dec. 5, 1911 |
| 1,346,493 | Hammond et al. | July 13, 1920 |
| 1,815,786 | Long | July 21, 1931 |
| 1,971,686 | Kinkead | Aug. 28, 1934 |
| 1,972,289 | Chauveau | Sept. 4, 1934 |
| 2,192,242 | Robinson et al. | Mar. 5, 1940 |
| 2,339,293 | Reiber | Jan. 18, 1944 |
| 2,357,297 | Wack et al. | Sept. 5, 1944 |
| 2,613,265 | Halvorsen | Oct. 7, 1952 |